April 24, 1928.

S. P. NIXDORFF 1,667,672

FREQUENCY CHANGER

Filed Sept. 22. 1926

2 Sheets-Sheet 1

Inventor:
Samuel P. Nixdorff,
by
His Attorney.

April 24, 1928.

S. P. NIXDORFF 1,667,672

FREQUENCY CHANGER

Filed Sept. 22. 1926  2 Sheets-Sheet 2

Inventor:
Samuel P. Nixdorff,
by *Alexander S. Lund*
His Attorney.

Patented Apr. 24, 1928.

1,667,672

UNITED STATES PATENT OFFICE.

SAMUEL P. NIXDORFF, OF SCHENECTADY, NEW YORK, ASSIGNOR TO GENERAL ELECTRIC COMPANY, A CORPORATION OF NEW YORK.

FREQUENCY CHANGER.

Application filed September 22, 1926. Serial No. 137,155.

My invention relates to frequency changers and has for its principal object the provision of an improved frequency changer that may be readily operated to control the direction in which power is transmitted between different electrical circuits or systems.

It is frequently desirable that means be provided for controlling the direction in which power is transmitted between circuits operated at different frequencies. In accordance with my invention, this result is effected by means of a frequency changer wherein a plurality of space discharge elements are arranged in groups adapted either to rectify or to derectify the current transmitted between the circuits and wherein means are provided for controlling the grid potentials of these different groups of space discharge devices in a manner to cause one group to rectify the current while the other group derectifies it at the frequency of the circuit to which it is supplied.

My invention will be better understood from the following description when considered in connection with the accompanying drawings and its scope will be pointed out in the appended claims.

Figure 1:
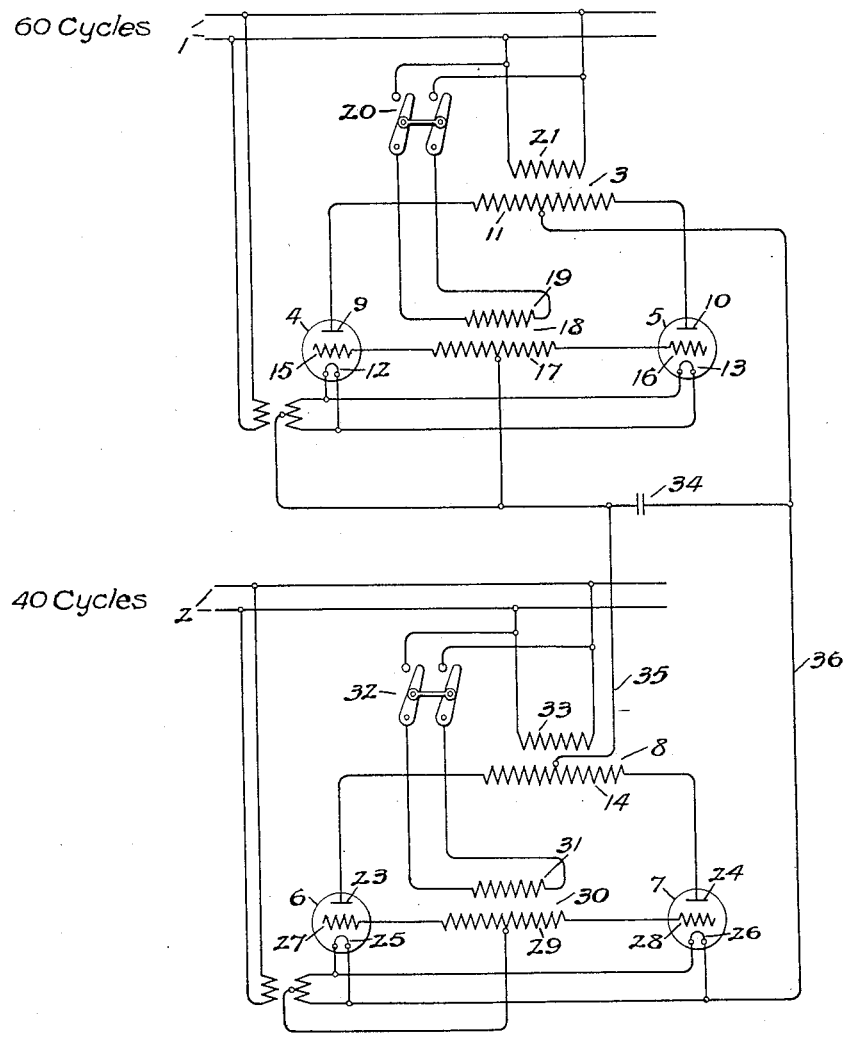
Figure 2:
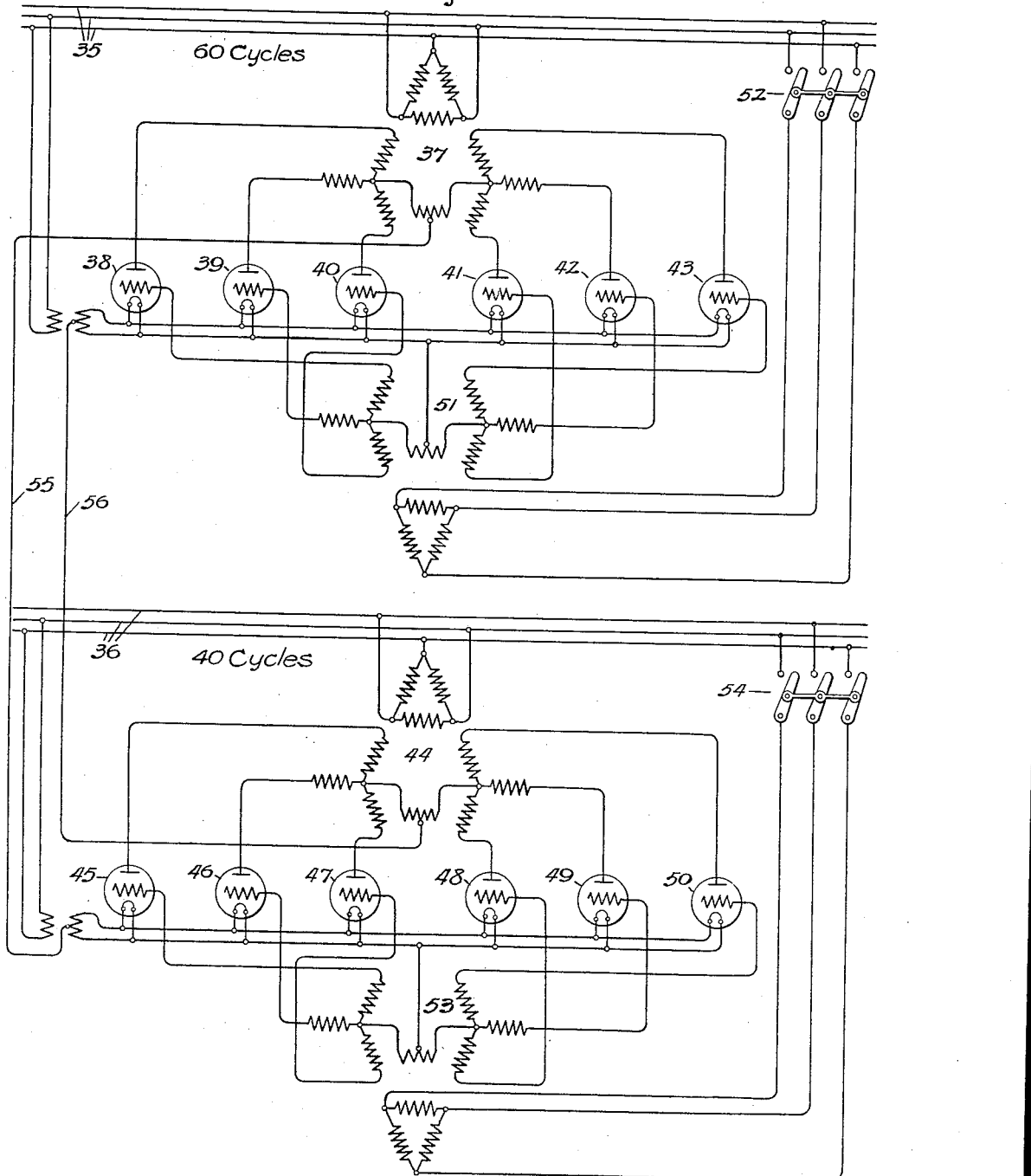

Referring to the drawings, Fig. 1 illustrates the application of my invention to a single phase frequency changer; and Fig. 2 illustrates its application to a polyphase frequency changer.

The single phase apparatus illustrated by Fig. 1 comprises alternating current terminals 1 and alternating current terminals 2 which may be operated at different frequencies and are interconnected through means comprising a transformer 3, space discharge elements 4 and 5, space discharge elements 6 and 7 and a transformer 8.

The space discharge elements 4 and 5 are provided with anodes 9 and 10 which are connected respectively to the opposite end terminals of a winding 11 of the transformer 3, with cathodes 12 and 13 which are connected to a terminal intermediate the ends of a winding 14 of the transformer 8, and with grids 15 and 16 which are connected respectively to the cathodes 12 and 13 through opposite halves of a secondary winding 17 of a grid transformer 18. The primary winding 19 of the transformer 18 is connected to the terminals 1 through a switch 20. Current is supplied through the terminals 1 to a winding 21 of the transformer 3 and to the cathodes 12 and 13.

The space discharge elements 6 and 7 are provided with anodes 23 and 24 which are connected respectively to the opposite end terminals of the winding 14 of transformer 8, with cathodes 25 and 26 which are connected to a terminal intermediate the ends of the winding 11 of the transformer 3, and with grids 27 and 28 which are connected respectively to the cathodes 25 and 26 through opposite halves of a secondary winding 29 of a grid transformer 30. The transformer 30 comprises a primary winding 31 which is connected to the terminals 2 through a switch 32. Current is supplied through the terminals 2 to a winding 33 of the transformer 8 and to the cathodes 25 and 26. A smoothing condenser 34 is connected across the direct current circuit 35—36 through which the two groups of space discharge elements are interconnected. It will of course be understood that the circuit 35—36 may be a direct current transmission line interconnecting two power stations or the like.

Assuming the terminals 1 to be operating at a frequency of 60 cycles and the terminals 2 to be operating at a frequency of 40 cycles, the direction in which power is transmitted between these two sets of terminals is readily controlled by means of the switches 20 and 32. Thus if the switch 32 is closed and the switch 20 is open, current is supplied through the terminals 1 to the terminals 2, this current being rectified by the upper group of space discharge elements and supplied to the lower group which derectifies it at 40 cycles or the operating frequency of the terminals 2. Likewise when the switch 20 is closed and the switch 32 is open, current is supplied through the terminals 2 to the terminals 1. Under these conditions, the lower group of space discharge elements function to rectify this current and the upper group function to derectify it at the operating frequency of the terminals 1.

The arrangement and operation of the polyphase apparatus illustrated by Fig. 2 will be readily understood in view of the foregoing explanation. This apparatus comprises polyphase terminals 35 and 36 which are interconnected through a transformer 37, a group of space discharge elements 38 to 43 each connected in a different phase lead of the transformer, a transformer 44, and a group of space discharge elements 45 to 50 each connected in a different phase lead of the transformer 44. A grid transformer 51 and a switch 52 are provided for controlling the grid potentials of the space discharge elements 38 to 43, and a grid transformer 53 and switch 54 are provided for controlling the potentials of the space discharge elements 45 to 50.

Direct current is transmitted between the upper and lower groups of space discharge elements through leads 55 and 56. Transfer of power from the terminals 35 to the terminals 36 is effected by closing the switch 54 and opening the switch 52. Transfer of power in the opposite direction is effected by opening switch 54 and closing switch 52. The switches 20 and 32 of Fig. 1 and the switches 52 and 54 of Fig. 2 thus afford an extremely simple and reliable means of controlling the direction in which power is transmitted between circuits operated at different frequencies.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of a plurality of circuits operated at different frequencies, space discharge apparatus provided with a plurality of cathodes and anodes connected between said circuits, and electrostatic control means operable to change the direction of power transmission between said circuits.

2. The combination of a plurality of circuits operated at different frequencies, space discharge apparatus provided with a plurality of cathodes and anodes connected between said circuits and with a plurality of grids, and grid potential control means operable to change the direction of power transmission between said circuits.

3. The combination of a plurality of circuits operated at different frequencies, space discharge apparatus provided with a plurality of cathodes and anodes connected between said circuits and with a plurality of grids, and means connected between said grids and said circuits for changing the direction in which power is transmitted between said circuits.

4. The combination of a plurality of circuits operated at different frequencies, groups of space discharge elements connected between said circuits and provided with control electrodes, and means arranged to connect the control electrodes of one of said groups to one of said circuits and to connect the control electrodes of the other of said groups to another of said circuits.

In witness whereof, I have hereunto set my hand this 21st day of September, 1926.

SAMUEL P. NIXDORFF.